United States Patent [19]

Hogan

[11] Patent Number: 4,558,765
[45] Date of Patent: Dec. 17, 1985

[54] BRAKE ASSEMBLY FOR BICYCLE

[76] Inventor: Thomas B. Hogan, 9 Seven Oaks La., Brewster, N.Y. 10509

[21] Appl. No.: 541,691

[22] Filed: Oct. 13, 1983

[51] Int. Cl.[4] .............................................. B62L 1/14
[52] U.S. Cl. ................................ 188/24.19; 188/24.21
[58] Field of Search ................. 188/2 D, 24.11, 24.12, 188/24.13, 24.19, 24.21, 24.22, 205 R

[56] References Cited

U.S. PATENT DOCUMENTS

| | | | |
|---|---|---|---|
| 3,878,920 | 4/1975 | Fugii | 188/2 D X |
| 4,036,333 | 7/1977 | Mathauser | 188/24.11 X |
| 4,051,924 | 10/1977 | Yoshigai | 188/24.12 |

FOREIGN PATENT DOCUMENTS

| | | | |
|---|---|---|---|
| 556919 | 7/1923 | France | 188/24.12 |
| A57872 | 9/1953 | France | 188/24.22 |

OTHER PUBLICATIONS

Bicycle Product News (Mar. 1983) pp. 10 & 21, "Brake Adapter" of American Cycle Systems (ACS).

Brochure handed out Feb. 22, 1983, by ACS at Int'l Bicycle Show, N.Y. Coliseum.

*Primary Examiner*—Bruce H. Stoner, Jr.
*Assistant Examiner*—Richard R. Diefendorf
*Attorney, Agent, or Firm*—Leo Zucker

[57] ABSTRACT

A bicycle brake assembly includes a bracket member having a pair of elongate legs each arranged to extend on a different side of the rotational plane of a wheel. A pair of brake pad devices are mounted on the legs for pivotable movement and longitudinal movement relative to the associated legs, and the brake pad devices can be fixed at a desired longitudinal position relative to the legs. An actuating mechanism is linked to the brake pad devices for pivoting them together toward the wheel so that brake pads in the devices frictionally contact the wheel. The location at which the brake pads engage the wheel in the radial direction thus is determined according to the positions at which the brake pad devices are fixed on the legs of the bracket member. Optimum braking action therefore can be obtained regardless of the particular position at which the bracket member itself is fixed in the radial direction.

7 Claims, 3 Drawing Figures

BRAKE ASSEMBLY FOR BICYCLE

BACKGROUND OF THE INVENTION

The present invention relates generally to brake assemblies, and particularly to a brake assembly suitable for mounting on the frame of a bicycle, wherein brake pad devices are arranged for braking movement on both sides of the rotational plane of a bicycle wheel.

Conventional brake assemblies for bicycles generally include a pair of brake pad actuating arms which extend tonglike from a common pivotal mounting point on the bicycle frame, above the outer circumference of and in the rotational plane of the wheel. The known bicycle brake assemblies have the limitation that the common pivot point for the brake arms usually must be located close to the rotating wheel rim which is to be braked by the pads associated with the arms. Alternatively, relatively long pull levers must extend from the brake arms so that an actuating cable linked to the levers will achieve sufficient leverage to urge the brake pads against the wheel with braking force. Further, only a very small working range of adjustment of the brake pads in the radial direction of the wheel, if any at all, is obtainable with the conventional brake arrangements. Accordingly, it is not always possible to replace existing bicycle wheels with ones of different radial dimensions without providing a different bicycle brake assembly and/or remounting the brake assembly at a different location on the bicycle frame near the outer circumference of the wheel.

SUMMARY OF THE INVENTION

An object of the present invention is to overcome the above and other shortcomings in the known bicycle brake assemblies.

Another object of the invention is to provide a brake assembly which, when mounted on a bicycle frame, can provide satisfactory braking operation for wheels of different sizes and shapes.

Another object of the invention is to provide a brake assembly which can easily be substituted for existing bicycle brake assemblies.

Yet another object of the invention is to provide a brake assembly which is simple to install on a bicycle frame but nevertheless affords a large degree of adjustability to obtain optimum braking performance for various sized wheels.

According to the invention, a brake assembly includes bracket means having a pair of spaced apart legs each arranged to extend radially of the wheel when the bracket means is fixed to a frame body. A pair of brake pad devices are mounted on the legs of the bracket means each for braking movement relative to the associated leg, and actuating means coupled to the brake pad devices serve to move the brake pad devices toward a braking position whereat brake pads associated with the devices frictionally contact the wheel. The location at which the brake pads contact the wheel in the radial direction thus is determined in accordance with the positions at which the brake pad devices are fixed along the legs of the bracket means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
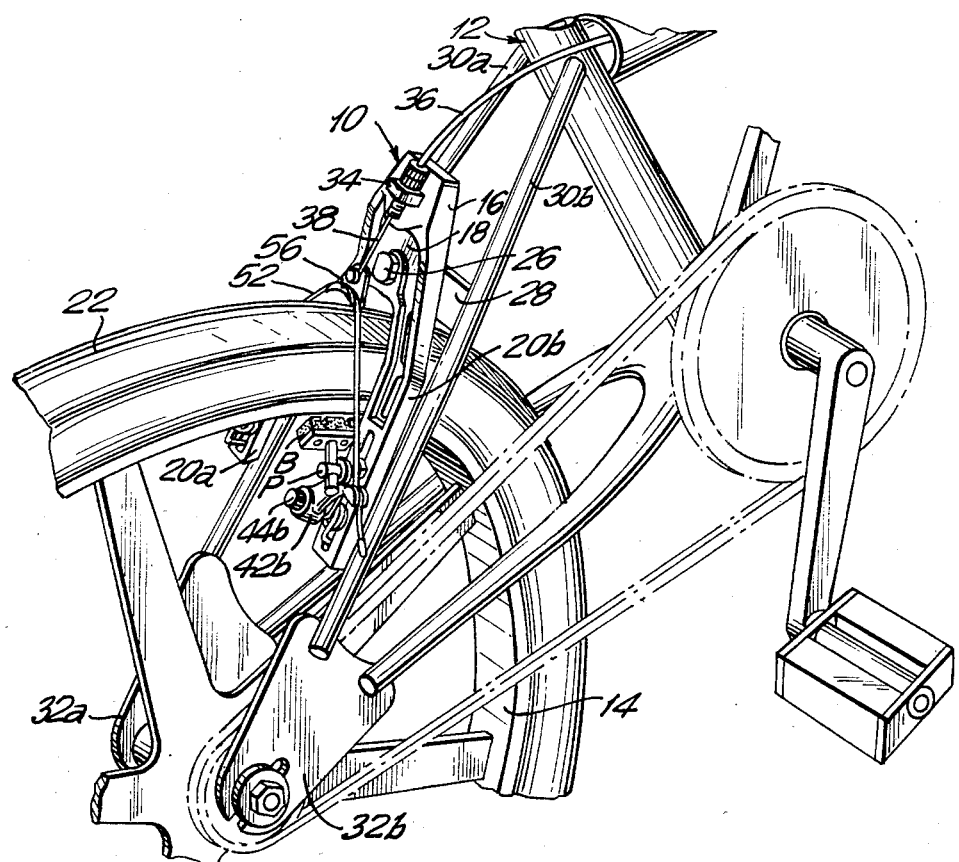
FIG. 1 is a perspective view of a brake assembly according to the present invention, as mounted on the rear portion of a bicycle frame for braking a rear wheel.

FIG. 1 shows a bicycle brake assembly 10 mounted to a bicycle frame body 12. Although the bicycle brake assembly 10 is shown in operative relation to a rear wheel mounted for rotation relative to the frame body 12, the present bicycle brake assembly 10 also may be used for braking of a front bicycle wheel (not shown), as well.

Figure 2:
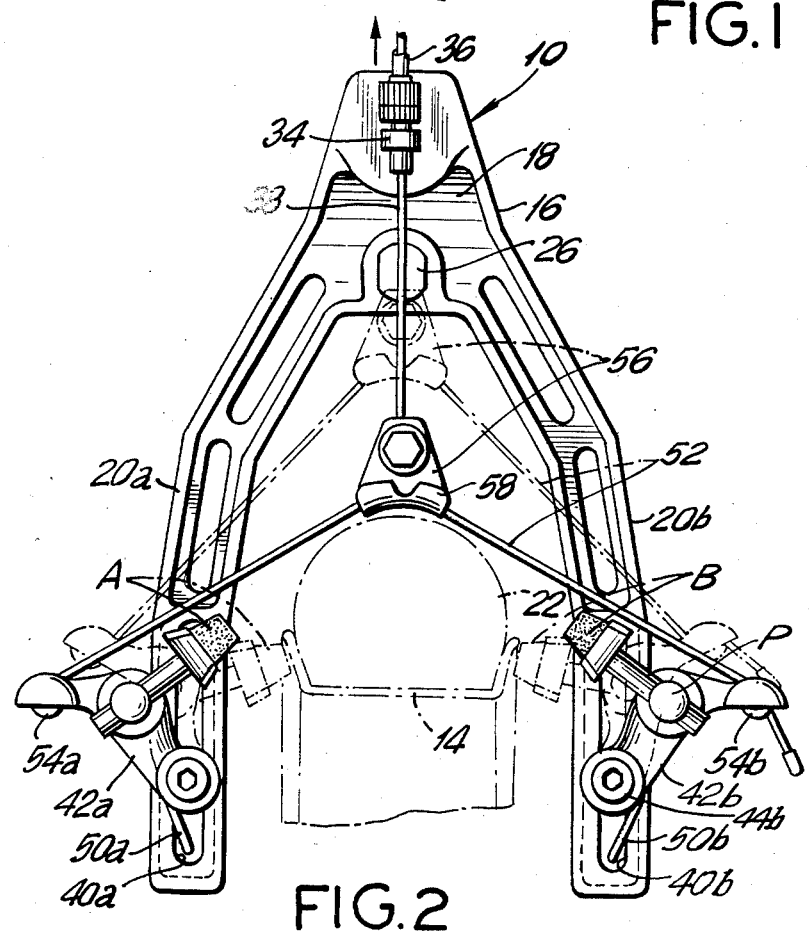
FIG. 2 is an enlarged, elevational view of the brake assembly; illustrating operation of the brake pad devices.
Figure 3:
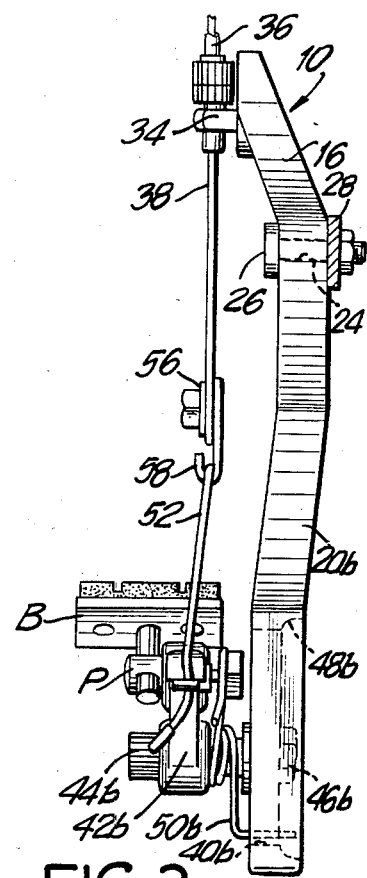
FIG. 3 is a side view of the brake assembly in FIG. 2.

As shown more clearly in FIGS. 2 and 3, the brake assembly 10 includes a generally U-shaped bracket member 16 having a base portion 18 and a pair of elongate legs 20a and 20b arranged to extend a certain distance generally parallel to the plane of rotation of the wheel 14. Legs 20a and 20b also spread apart a sufficient distance from one another so as to allow for clearance of a tire 22 at the outer circumference of the wheel 14 when the bracket member 16 is fixed to the frame body 12.

The base portion 18 of the bracket member 16 has an opening 24 (FIG. 3) in the lower center region of the base portion 18, to allow for passage of a fixing bolt 26 through the bracket member 16, so as to fix the bracket member 16 to the frame body 12 against a flat cross member 28. The cross member 38 joins a pair of tubular members 30a and 30b extending from beneath the bicycle seat (not shown) to support a pair of rear wheel axle bearing plates 32a and 32b, as shown in FIG. 1.

Bracket member 16 also preferably includes a cable anchoring post 34 projecting from the central upper region of the base portion 18, as illustrated in the drawing, for fixing a sheathing 36 of a sheathed astuating cable 38. The cable actuates the brake assembly 10 when pulled at a remote end of the cable 38 as by a conventional bicycle brake handle mounted on a handle bar (not shown).

The bracket member 16 preferably is formed of aluminum or magnesium, but may as well be formed of a suitably hard plastics material. A pair of elongate slots 40a and 40b are each formed of a different one of the bracket member legs 20a and 20b, as shown in FIG. 2. Each of the slots 40a and 40b is arranged to receive and guide for adjusting movement in the long direction of the legs 20a and 20b, corresponding mounting shoulder bolts of a pair of brake pad devices 42a and 42b. As shown in FIG. 3, a mounting shoulder bolt 44b for the brake device 42b, serves as a pivot for the device 42b and extends through the slot 40b in the leg 20b to be fixed in a desired longitudinal position by a nut 46b. The nut is captured and contained entirely within a longitudinal recess 48b in the surface of the bracket member 16 opposite that from which the brake pad device 42b extends. The brake pad device 42a is mounted in the same manner on the leg 20a of the bracket member 16.

Accordingly, each of the brake pad devices 42a and 42b can be set in a desired longitudinal position relative to the corresponding bracket member leg 20a or 20b, and be pivoted about an axis substantially perpendicular to the plane of the bracket member 16 wherein the mounting bolts for the brake pad devices serve as the pivots.

The brake pad devices 42a and 42b may be conventional cantilever brake devices and, when mounted on the bracket member 16, are biased toward a retracted position as shown in solid lines in FIG. 2 by associated spring members 50a and 50b. One end of each of the spring members 50a and 50b is retained in an associated slot 40a or 40b. The remaining portions of the spring members 50a, 50b are wound about the axis of the brake pad devices so that the remaining ends of the spring members rest against the bodies of the brake pad devices to pivot them in directions away from one another end, thus, out of frictional contact with the rim of the wheel 14 located between the legs of the bracket member 16, in the retracted position shown in FIG. 2.

Ends of the brake pad devices 42a, 42b remoted from the pivot axes of the devices, are linked to one another by a connecting wire or cable 52. Cable 52 forms part of a Y harness together with the actuating cable 38, as shown in FIG. 2. The ends of the cable 52 are fixed to bobbins 54a and 54b which are captured in corresponding recesses formed in the free ends of the brake pad devices 42a, 42b, as shown in FIGS. 2 & 3. The length of the linking cable 52 should be sufficient so that the cable remains clear of the outer circumference of the bicycle tire 22 when the brake pad devices 42a, 42b are in the retracted position and the devices are mounted in the desired longitudinal position on the bracket member legs 20a, 2b. The actuating cable 38 is coupled to the linking cable 52 by way of a coupling member 56 to which the end of the cable 38 is clamped. The linking cable 52 is retained in a lip 58 formed on the coupling member 56. Accordingly, when the actuating cable 38 is pulled by way of the brake handle (not shown) the coupling member 56 will pull the linking cable 58 upward, as shown in FIG. 2, thus pivoting the brake pad devices 42a, 42b in directions toward the wheel 14 so that brake pads A&B of the devices will frictionally engage the rim of the wheel 14, as shown in dotted lines in FIG. 2. Preferably, the coupling member lip 58 should allow the linking cable 52 to slide freely within the lip 58 so that the brake pad devices 42a, 42b will be caused to rotate in unison, by substantially the same amount, and the brake pads will impart about the same braking force against the wheel rim during a braking operation. When the brake handle on the bicycle is released, the spring members 50a, 50b associated with the brake pad devices 42a, 42b will cause the devices to retract, and the linking cable 52 will take up slack in the actuating cable 58 through the coupling member 56, to arrive at the position shown in solid lines in FIG. 2.

As shown in FIG. 3, the anchoring post 34 is located on the base portion 18 of the bracket member 16 relative to the brake pad devices so that the linking cable 52 transmits a pivoting force to the brake pad devices in a plane substantially perpendicular to the pivot axes of the brake pad devices, when the coupling member 56 is pulled by the actuating cable 38. It will be appreciated that such configuration provides for maximum operating efficiency and, further, avoids deflection of the bracket member legs 20a, 20b in response to forces applied to the brake pad devices 42a, 42b by the linking cable 52.

It will be appreciated that the present brake assembly 10 provides a significant degree of adjustability in that the brake pad devices 42a, 42b can be located so that their associated brake pads frictionally contact the wheel at an optimum location to brake the wheel. In the event the legs 20a, 20b of the bracket member 16 are not aligned radially of the wheel when the bracket member 26 is fixed to the body frame 12, the brake pad devices 42a, 42b can be constructed to allow the brake pads A & B to be rotated about an axis substantially perpendicular to the plane of contact with the wheel rim, as well as to allow the brake pads to extend by an adjustable distance from the bodies of the devices 42a, 42b so that the brakes pads will initially contact the wheel rim at about the same time during a braking operation. Such construction is shown on the brake pad devices 42a, 42b, wherein mounting shafts of the brake pads A and B (see FIG. 3) are located against rotational and axial movement when clamped by locking posts P against the bodies of the devices.

The present bicycle brake assembly 10 preferably is mounted on the bicycle frame body 12 so that the legs 20a, 20b of the bracket member 16 are flush against the tubular members 30a, 3b of the frame body 12, and on the side of the tubular members facing opposite the forward rotational direction of the wheel 14. Since the securing nuts which threadably engage the shoulder bolts of the brake pad devices are contained entirely within the recesses in the bracket member (e.g., nut 46b, bolt 44b and recess 48b in FIG. 3), the securing nuts will not interfere with the flush mounting of the bracket member legs against the tubular members of the frame body. Accordingly, when the brake pad devices 42a, 42b frictionally contact the wheel, reaction forces transmitted through the devices to the legs of the bracket member 16 will be applied by the legs over portions of the tubular members 30a, 30b of the frame body 12, and without significant deflection of the bracket member legs 20a, 20b.

Also, depending upon the location at which the bracket member 16 is to be fixed on the frame body 12, i.e., either above the rear or the front wheel, the shape of the bracket member 16 as viewed from the side in FIG. 3 may vary to some degree to allow the bracket member 16 to conform to various parts of the frame body 12 in the vicinity of the mounting location for the brake assembly 10.

While specific embodiments of the invention have been shown and described in detail to illustrate the application of the inventive principles, it will be understood that the invention may be embodied otherwise without departing from such principles. For example, the brake pad devices 42a, 42b can be adjustably fixed at desired positions on the legs 20a, 20b of bracket member 16 by removably clamping separate supporting bases on which the devices pivot, directly to the legs. In such case, the leg slots 40a, 40b may be omitted.

I claim:

1. A brake assembly for braking a wheel mounted on a frame body for rotation relative to the frame body in a forward rotational direction, the frame body including a pair of tubular members each extending generally radially of the wheel and on a different side of the plane of wheel rotation, the assembly comprising:

a generally U-shaped bracket member including a base portion and a pair of spaced apart legs;

means for fixing said bracket member to the frame body so that at least a portion of each of said legs is flush against a different one of the tubular members of the frame body;

a pair of cantilever brake pad devices each adapted to be mounted at a desired longitudinal position within a certain adjustment range on a different one of said legs of said bracket member, for pivotable movement about an axis substantially perpendicular to the plane of said bracket member, wherein reaction forces transmitted through said brake pad devices to each of said legs of said bracket member are applied by said legs over portions of the tubular members of the frame body when said brake pad devices frictionally contact the forward rotating wheel;

means for mountinig each of said brake pad devices at said desired longitudinal position within said certain adjustment range on said legs of said bracket member, said adjustment range extending in a genereally radial direction relative to the wheel when said bracket member is fixed to the frame body; and actuating means for pivoting said brake pad devices toward a braking position to frictionally contact the wheel, said actuating including anchoring means fixed at said base portion of said bracket member for fixing the position of an end of a sheathing of a sheathed actuating cable relative to said bracket member, a linking cable coupled to said pair of brake pad devices for pivoting said devices toward said braking position, and coupling means for transmitting an operating force to said linking cable in response to pulling movement of an actuating cable extending from said anchoring means;

wherein said anchoring means is positioned on said bracket member relative to said brake pad devices so that said linking cable transmits a pivoting force to said brake pad devices in a plane substantially perpendicular to the pivot axes of said brake pad devices when said coupling means is pulled by the actuating cable.

2. A brake assembly according to claim 1, wherein said base portion of said bracket member has an opening for receiving a fastening member to fix said base portion against a part of the frame body, sand said means for fixing said bracket member to the frame body includes said base portion and said fastening member.

3. A brake assembly according to claim 1, wherein said pair of legs of said bracket member each has a slot extending in the long direction of the leg for defining said certain adjustment range and receiving a mounting member of a corresponding brake pad device, and said means for mounting each of said brake pad devices includes means for securing said mounting member at said desired longitudinal position within said adjustment range defined by said slot.

4. A brake assembly according to claim 3, including a pair of shoulder bolts forming the mounting members for said brake pad devices.

5.

A braking assembly according to claim 4, wherein each of said legs has an elongate recess opening into said slot, and said securing means includes a pair of nuts for engaging said shoulder bolts wherein said nuts are captured in the recesses of said legs and are contained entirely within said recesses.

6. A brake assembly according to claim 4, wherein said shoulder bolts form the pivot axes about which said brake pad devices move when said actuating means is operated.

7. A brake assembly according to claim 1, wherein each of said pair of brake pad devices includes associated biasing means for urging said brake pad devices to move toward a retracted position out of frictional contact with the wheel.

* * * * *